United States Patent [19]
Heilman et al.

[11] 3,905,193
[45] Sept. 16, 1975

[54] AIR DIVERTER VALVE AND CONTROLLING MEANS THEREFOR
[75] Inventors: Gerald D. Heilman; Gordon R. Paddock, both of Rochester, N.Y.
[73] Assignee: General Motors Corporation, Detroit, Mich.
[22] Filed: Feb. 25, 1974
[21] Appl. No.: 445,114

[52] U.S. Cl. .................................. 60/290; 60/289
[51] Int. Cl.² ....................................... F02B 75/10
[58] Field of Search ............................ 60/290, 289

[56] References Cited
UNITED STATES PATENTS

| | | | |
|---|---|---|---|
| 3,059,419 | 10/1962 | Schnabel | 60/290 |
| 3,106,820 | 10/1963 | Schaffer | 60/290 |
| 3,279,697 | 10/1966 | Buratti | 235/200 R |
| 3,433,242 | 3/1969 | Voorheis | 60/290 |
| 3,805,522 | 4/1974 | Sheppard | 60/290 |

Primary Examiner—Douglas Hart
Attorney, Agent, or Firm—C. K. Veenstra

[57] ABSTRACT

In an emission control system for delivering air from an engine driven positive displacement air pump to an engine exhaust system, an air diverter valve has a proportioning diaphragm assembly responsive to manifold vacuum which moves the diverter valve to divert some or all of the air flow away from the exhaust system and instead discharge it directly to the atmosphere. During low manifold vacuum operation of the engine a spring biases the valve to permit air flow to the exhaust system. During comparatively high manifold vacuum operation, however, the proportioning diaphragm moves the diverter valve to a divert position to prevent such air flow. A range of intermediate positions allows the diverter valve to meter air flow to the exhaust system in inverse proportion to manifold vacuum.

3 Claims, 3 Drawing Figures

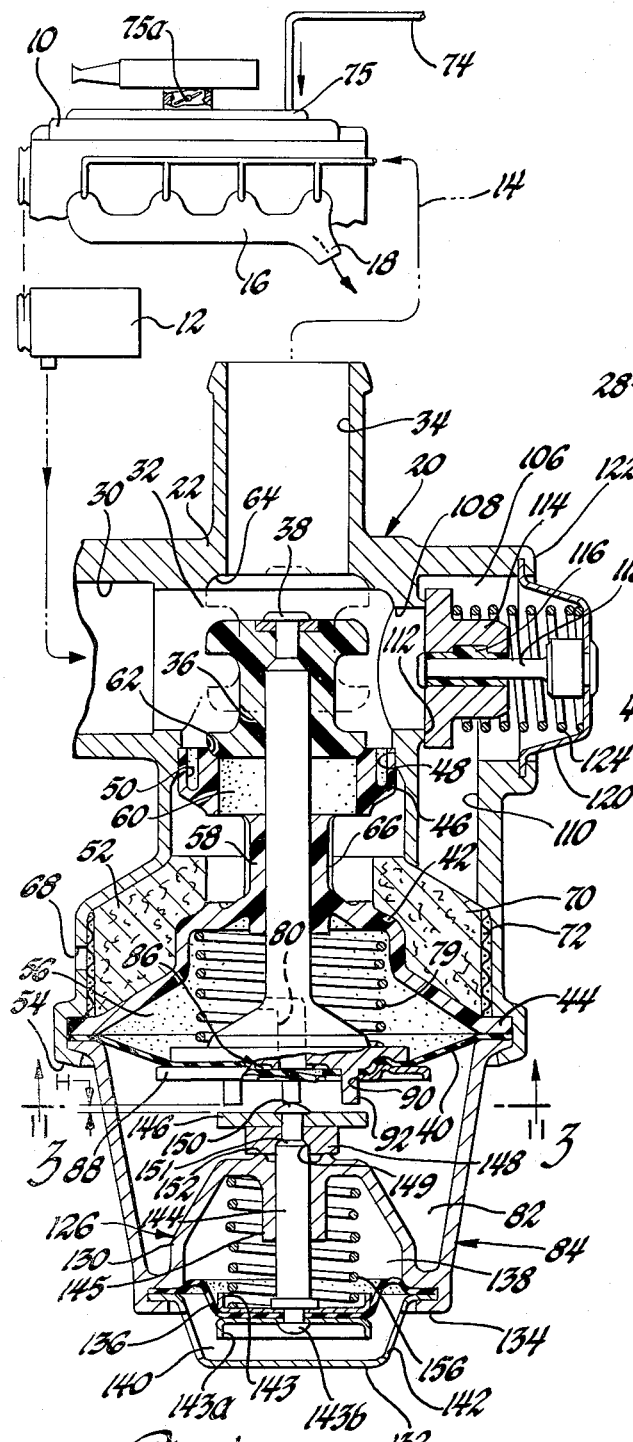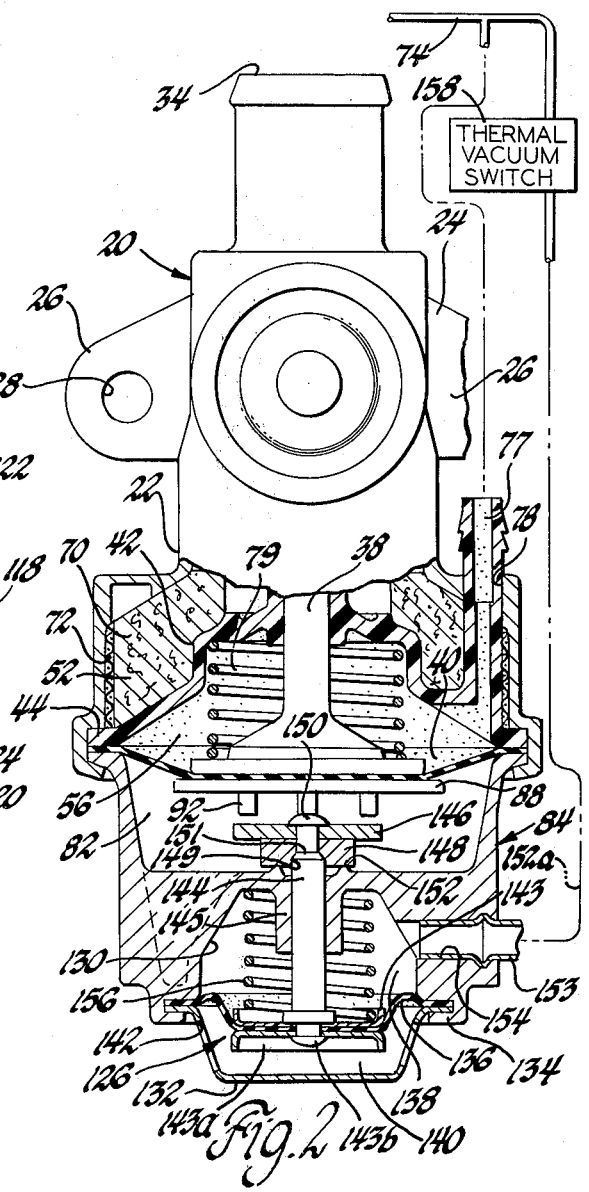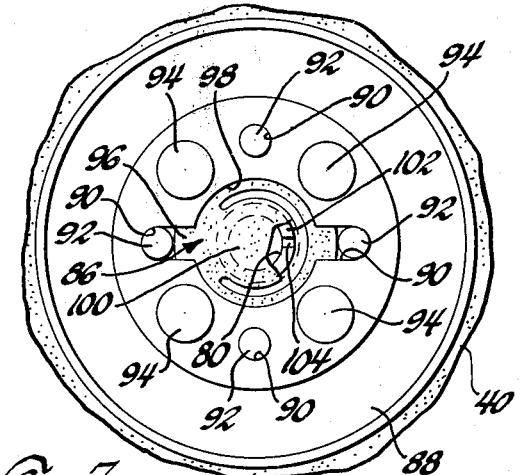

AIR DIVERTER VALVE AND CONTROLLING MEANS THEREFOR

BACKGROUND OF THE INVENTION

This invention relates to an air diverter valve for use in an emission control system for delivering air from an air pump to the exhaust system of an internal combustion engine and, more particularly, to an air diverter valve which is used to divert some or all of the air flow away from the exhaust system and instead discharge it directly to the atmosphere.

Air diverter valves such as the one set forth in U.S. Pat. No. 3,835,646 provide a manner of control which includes pressure relief and anti-backfire provisions. In those valves the anti-backfire provisions include an acutating diaphragm energized by a sudden decrease in manifold pressure or increase in manifold vacuum to close the diverter valve for a selected period of time during deceleration. After this period, a bleed passage equilibrates pressure acting on opposite sides of the diaphragm to allow a spring to open the diverter valve, thus permitting air flow to the exhaust system. During a period where manifold vacuum decreases, which would occur during acceleration or heavy load conditions, a check valve opens to equilibrate the pressures across the actuating diaphragm and allow the spring to open the diverter valve and permit air flow to the exhaust system.

BRIEF SUMMARY OF THE INVENTION

The present invention employs the structure of the aforedescribed air diverter valve and additionally includes a proportionaing diaphragm assembly responsive to the vacuum in the induction manifold (downstream of the throttle), henceforth termed manifold vacuum. by using a manifold vacuum responsive valve as a means for regulating flow from an engine driven positive displacement air pump, the air flow to the exhaust system is regulated in a so-called speed-density manner and thus is proportional to the flow of exhaust gases from the engine. By delivering air to the exhaust system, in proportion to the flow of exhast gas, the air optimizes oxidation reactions in the exhaust system and thus reduces the concentrations of the undesirable constituents therein.

The manner of operation of this invention can be summarized as follows: When exposed to high manifold vacuum which occurs during closed throttle operation, the proportioning diaphragm assembly closes the diverter valve to prevent air flow to the exhaust system and divert air flow directly to the atmosphere. However, when exposed to comparatively low manifold vacuum which occurs during heavy load or acceleration, the proportioning diaphragm assembly permits the diverter valve to open and allow air flow to the exhaust system. A range or continuum of intermediate positions of the diverter valve are available which allows this invention to act as a proportioning valve to control air flow to the exhaust system in inverse accordance with manifold vacuum.

It is a further feature of the present invention that optionally during operation of the engine from a cold start, the manifold vacuum signal to the proportioning diaphragm assembly is bled to the atmosphere to disable the proportioning function. To acheive this, an inline thermal vacuum switch responsive to the operating temperature of the engine is provided to temporarily prevent vacuum from being admitted to the proportioning diaphragm assembpy during the period where the operating temperature is below a preselected temperature. During that period, the timed anti-backfire operation of the diverter valve becomes effective to close the diverter valve only during deceleration as set forth in the aforesaid patent.

BRIEF DESCRIPTION OF THE DRAWINGS

The details as well as other objects and advantages of this invention are set foth in the remainder of the specification and are shown in the drawings in which:

FIG. 1 is a schematic view of an internal combustion engine having an air pump for delivering air to the exhaust system and showing the air diverter valve—in an enlarged sectional and elevational view—disposed between the pump and the exhaust system;

FIG. 2 is a side elevational view of the air diverter valve shown with parts broken away to illustrate further internal details of the construction of the assembly; and FIG. 3 is a side view indicated by the line 3—3 in FIG. 1 further enlarged to show the check valve included in the actuating diaphragm assembly.

DETAILED DESCRIPTION OF THE INVENTION

Refering first to FIG. 1, an internal combustion engine 10 has an air pump 12 which supplies air to a conduit 14 and to the exhaust manifold 16 or to another portion of the exhaust system 18. The injected air supports combustion of exhaust gas hydrocargons, carbon monoxide and the like.

An air diverter valve assembly 20 is mounted between pump 12 and flow conduit 14. As may be best seen in FIG. 2, the housing 22 of assembly 20 has a flange 24 equipped with a pair of ears 26 each including a hole 28 to receive a bolt for securing assembly 20 to air pump 12 or engine 10.

Housing 22 has a lateral inlet 30 extending to a valve chamber 32. Air is received from air pump 12 through inlet 30 and is discharged through a main outlet 34 to air flow conduit 14.

A valve member 36 is disposed in valve chamber 32 and is secured to the upper end of a valve stem 38. The lower end of valve stem 38 is secured to a diaphragm 40 which closes the lower end of housing 22.

A fiberglass-reinforced nylon insert member 42 is secured about its lower rim 44 between diaphragm 40 and housing 22. The upper rim 46 of insert 42 is pressed into a bore 48 of housing 22—a deep groove 50 in rim 46 facilitating the press fit.

The press fit of rim 46 in bore 48 prevents direct leakage of air from valve chamber 32 to the annular chamber 52 defined between insert 42 and housing 22. The lower rim 54 of housing 22 is spun over rim 44 of insert 42 and the peripheral edge of diaphragm 40 to seal a chamber 56, defined between diaphragm 40 and insert 42, from annular chamber 52. A guide portion 58 of insert 42 fits closely about stem 38 both to support and guide stem 38 and to prevent leakage of air from chamber 52 into chamber 56.

Insert 42 has a cylindrical recess 60 surrounding guide portion 58. The upper periphery of recess 60 defines a lower valve seat 62 which is engaged by the lower portion of valve member 36. When valve stem 38 is displaced upwardly, valve member 36 will be moved away from valve seat 62 to a dirert position (shown in phantom) and will engage an upper valve seat 64 surrounding main outlet 34. This will prevent air flow from inlet 30 to main outlet 34 and will divert that air flow into recess 60 from which it passes into annular chamber 52 through a pair of diametrically opposed apertures 66. The air then flows from chamber 52 through a plurality of apertures 68 to the atmosphere.

An annular pad of silencing material 70 may be optionally disposed in chamber 52 and may be surrounded by a ring of screening material 72 to prevent the silencing material 70 from puffing outwardly into apertures 68.

A branched vacuum conduit 74 extends from a source of manifold vacuum, such as the intake manifold 75 downstream of the throttle 75a, to a vacuum fitting 77 formed as a portion of insert member 42 and extending through an opening 78 in housing 22. During closed throttle engine deceleration, manifold vacuum rises abruptly, and the vacuum in chamber 56 increases correspondingly to raise diaphragm 40 and valve stem 38 against the bias of an actuating spring 79, thus moving valve member 36 to the divert position. As explained above, this seats valve member 36 against seat 64 to interrupt air flow from pump 12 to exhaust manifold 16 and thus prevent backfiring in the exhaust system.

As shown in FIG. 1, a passage 80 is formed in and extends through the lower portion of valve stem 38 to connect vacuum chamber 56 with a control chamber 82 defined between diaphragm 40 and a lower housing portion 84. Lower housing portion 84 is adapted for registration with and is secured to housing 22 by means of spun over portions 54 of housing 22. A check valve 86 is disposed in passage 80 to regulate flow between control chamber 82 and vacuum chamber 56.

The details of check valve 86 are shown in FIG. 3. A washer member 88 is disposed under diaphragm 40 and has a plurality of apertures 90 which recieve downwardly extending legs 92 formed on the lower portion of valve stem 38. Four of these legs are riveted, as at 94, to retain washer 88 against valve stem 38.

The outer rim 96 of check valve 86 is supported by the inner rim 98 of wahser 88. A central flap 100 of check valve 86 overlies an annular valve seat 102 formed at the base of stem member 38. A calibrated notch 104 is coined in seat 102.

In operation, chambers 56, 82, and check valve 86 coact as follows to provide the timed anti-backfire feature:

During the period when manifold vacuum in vacuum chamber 56 is increasing, fluid flow from control chamber 82 through passage 80 to chamber 56 is restricted in passing through notch 104. Thus, the volume of control chamber 82 and the size of notch 104 determine the time required for the pressure in chamber 82 to be reduced to the point at which the diaphragm 40 will be insufficient to oppose spring 79, whereby spring 79 will lower diaphragm 40, stem member 38 and valve member 36 to the valve open position shown. During a period of increasing pressure (or decreasing manifold vacuum) in chamber 56, central flap 100 will be pushed downwardly to allow unrestricted flow from chamber 56 through passage 80 to control chamber 82 and thus permit intermediate return of diaphragm 40, stem member 38 and valve member 36 to the valve open position shown.

Referring again to FIG. 1, housing 22 has a pressure relief passage 106 extending from a lateral opening 108 disposed in the side of valve chamber 32 diametrically opposite inlet 30. Pressure relief passage 106 includes an axially extending portion 110 which opens into the top of annular chamber 52.

A valve seat 112 is formed about opening 108 and is engaged by an epichlorhydrin valve member 114. Valve member 114 has a nylon sleeve 116 which slides on a shaft 118. Shaft 118 is mounted on a cover member 120 which is secured by spun over portion 122 of housing 22.

The pressure relief feature is provided by calibrated spring 124 which biases valve member 114 against seat 112 until the pump discharge pressure in valve chamber 32 upstream of seat 64 rises above a selected level. At that level, valve member 114 is displaced from valve seat 112 and a portion of the air flow through inlet 30 is diverted through opening 108 and passage 110 into annular chamber 52 and housing apertures 68 to the atmosphere.

A proportioning diaphragm assembly 126 is provided for positioning valve member 36 to control air flow in inverse proportion to manifold vacuum.

As shown in FIGS. 1 and 2, an upwardly extending cup 130 is formed integral with lower housing portion 84. A cover member 132 closes the inside of and is secured to the bottom of cup 130 by means of a spun over portion 134 of housing portion 84. Secured between cover member 132 and cuupt 130 is a second or proportioning diaphragm 136, which partitions the interior of cup 130 into a vacuum chamber 138 between cup 130 and diaphragm 136 and an atmospheric chamber 140 below diaphragm 136 and above cover member 132. Atmospheric pressure is admitted to chamber 140 through a plurality of openings 142 formed in cover member 132.

Diaphragm 136 is clamped between a pair of washers 143, 143a and secured to a rod member 144 by an overlapping upset rivet 143B. Rod 144 slides in a guide portion 145 centrally disposed in and extending downwardly from cup 130. Attached to the uppermost end of rod 144 is a platen 146 which resides on a spacer 148. Both are attached to rod member 144 by means of a countersunk recess 149 in spacer 148 and an upset rivet 150 extending from rod 144 and overlapping platen 146. Rivet 150 forces platen 146 and spacer 148 against a tapered land portion 151 of rod 144.

It should be noted that platen 146 is radially extending waher underlying the downwardly extending legs 92 of valve stem 38. Accordingly, platen 146 may engage legs 92 of valve stem 38 when the platen is raised a preselected height H by diaphragm 136. Usually, however, platen 146 and spacer 148 reside on a seat 152 formed around the upper end of guide portion 145 on the top of cup 130.

Vacuum is admitted from a source of manifold vacuum, such as intake manifold 75 to vacuum chamber 138 by means of a conduit 152a connected to a vacuum fitting 153 extending through and flared in a stepped hole 154 in lower housing portion 84 as shown in FIG. 2.

A calibrated proportioning spring 156 is axially disposed about rod member 144 between cup 130 and washer 143 and biases diaphragm 136, rod member 144, and platen 146 downwardly to the position shown in the Figures. In the absence of sufficient vacuum in chamber 138 to overcome spring 156, platen 146 does not engage legs 92 of valve stem 38 and cannot raise valve stem 38 and valve member 36 to the divert position. Thus, platen 146 and spacer 148 reside on seat 152 to seal chamber 138 from chamber 82.

In operation, when the vacuum admitted to chamber 138 attains a preselected level sufficient to overcome the initial resistance of spring 156, diaphragm 136, rod member 144, and platen 146 will move upwardly so that platen 146 engages and actuates legs 92. This moves valve stem 38 and valve member 36 upwardly toward the divert position against the secondary resistance of spring 79 until an intermediate equilibrium position is established. This equilibrium position is a function of the stiffness of springs 79 and 156, the effective area of diaphragm 136, the thickness of spacer 148, the length of legs 92, and the magnitude of the difference between manifold and atmospheric pressures.

The intermediate equilibrium position of valve stem 38 and valve member 36 will, of course, determine the amount of air that will be allowed to flow to the exhaust system and the amount that will be diverted to the atmosphere. It should be made apparent that the numerous intermediate positions of valve member 36 are a continous and direct function of the difference between atmospheric pressure and manifold vacuum. This accomplishes one aspect of the desired objects of the present invention, in that a range of positions of valve member 36 allows manifold vacuum to position the diverter valve and thereby regulate injected air flow to the exhaust system in a manner porportional to manifold vacuum, which achieves a load (or density) responsive manner of air flow control. By combining this device with an engine driven positive displacement air pump, such as 12, which is inherently speed responsive, a speed-density responsive air injection system is obtained, which achieves the desired objects of this invention.

In an alternative embodiment of this invention, during cold engine operation a thermal vacuum switch 158, which is responsive to the operating temperture, for example, of the engine or exhaust system, prevents manifold vacuum from reaching vacuum chamber 138 and the pressures occurring on opposite sides of proportioning diaphragm 136 are equilibrated (at atmospheric pressure). Consequently, the proportioning diaphragm 136 will not be effective to raise platen 146, legs 92, valve stem 38, and valve member 36 to position the valve in accordance with manifold vacuum. In this event spring 79 urges the valve fully open so that the maximum amount of air flow from pump 12 will be permitted to enter the exhaust system. This is desirable for promoting the post-combustion oxidation reactions in the exhaust system to reduce carbon monoxide and hydrocarbon emissions. It should be noted that the diverter valve will be responsive to the pressure relief and timed anti-backfire functions during this time.

The proportioning diaphragm 136 becomes effective after a predetermined warm-up period since thermal vacuum switch 158 opens and allows manifold vacuum to reach chamber 138. During periods where manifold vacuum is sufficent to move diaphragm 136, the combination of manifold vacuum occurring above and atmospheric pressure occurring below diaphragm 136 will raise daiphragm 136, stem 144, and platen 146 against spring 156 to engage legs 92 and thereby move valve stem 38 and valve member 36 toward the divert position. As manifold vacuum increases, it will further raise stem 38 against the urging of spring 79 thereby moving valve member 36 toward upper seat 64 to a full divert position. Accordingly, the air flow will be diverted from inlet 30 to chamber 52 and apertures 68 to the atmosphere.

It should be noted that during steady-state operation no pressure differential will occur across actuating diaphragm 40, becuase of the aforenoted equilibrating, timing function provided by central fap 100 and coined notch 104. However, during high vacuum deceleration the vacuum admitted to chamber 56 moves actuating diaphragm 40 and valve stem 38 upwardly to reposition valve member 36 to the full divert position for temporarily diverting air flow from the exhaust system. This will continue until the timing function provided by notch 104 predominates and equilibrates pressure across diaphragm 40 thereby returning valve member 36 to the position determined by proportioning diaphragm assembly 126.

At high altitude the maximum manifold vacuum attainable in chamber 138 may be insufficient for moving proportioning diaphragm 136 upwardly and raising valve member 36 toward upper seat 64 in order to completely divert air flow from the exaust system. Nevertheless, the actuating diaphragm 40 will temporarily seat valve member 36 on seat 64 during high vacuum decelerations, thereby diverting air flow to the atmosphere.

It should be further noted that the resistances of springs 156 and 79 and size of diaphragm 136 must be chosen to allow a range of positions of valve member 36 to allow it to continuously meter the flow of air to the exhaust system as a function of a specific, predetermined range of manifold vacuum.

It should be noted that thermal vacuum switch 158 is not necessary for the proportioning function of diaphragm 136 to be effective. However, the optional inclusion of this switch promotes oxidation of unburned hydrocarbon and carbon monoxide emissions during engine or reactor warm-up, because rich mixtures are used by the engine during warm-up and these mixtures require more air for oxidation in the exhaust system. By temporarily disabling the proportioning function of diaphragm 136 switch 158 allows maximum air flow to the exhaust system to promote oxidation therein.

Finally, it should be made apparent that the manner of air flow regulation acheived by the present invention is of the speed-density type. It is well known that the rate of air flow through the induction system, and thus the rate of exhaust gas flow through the exhaust system, is porportional to the speed of the engine and the density or pressure in the intake manifold. Engine driven positive displacement air pump 12 provides air flow in proportion to engine speed. Air diverter valve 20 permits a portion of that air flow proportional to the intake manifold pressure or density, to flow to the exhaust system. The speed-density control of air flow thereby regulates the air flow to the exhaust system in proportion to the flow of exhaust gas. In this manner the air injection requirements of the exhaust emission control system are met throughout the range of engine air flow to achieve an improved means of reducing the concentration of undesirable exhaust constituents. Simultaneously, the requirements for full diversion of air from the exhaust system during deceleration is met irrespective of the effect of altitude on the available manifold vacuum.

What is claimed is:

1. An air diverter valve for use on an intenal combustion engine having an induction system for air flow to the engine, a throttle in said induction system for controlling flow therethrough, an exhaust system, and an engine driven positive displacement air pump for supplying air to said exhaust system, said valve comprising a housing having an inlet adapted for receiving air from said pump and an outlet adapted for delivering air to said exhaust system, said housing further having a vent aperture between said inlet and said outlet, said vent aperture opening to the atmosphere, valve means associated with said outlet and said vent aperture and movable therebetween, said valve means having a plurality of intermediate positions for controlling flow through said outlet and said vent aperture by variably restricting said vent aperture and said outlet, spring means biasing said valve means in a vent closing direction and an outlet opening direction, first pressure responsive control means adapted for response to the pressure in said induction system downstream of said throttle and secured to said valve means for moving said valve means in a vent opening direction and an outlet closing direction upon sudden decrease in said induction system pressure, whereby said first control means are effective for interrupting air flow to said exhaust system upon deceleration, and second pressure responsive control means adapted for resonse to said induction system pressure and adapted to engage said first control means for moving said valve means in an outlet closing direction and a vent opening direction as said pressure decreases, whereby said second control means are effective to regulate the amount of air delivered to said exhaust system in a manner proportional to said pressure and thus in a manner proportional to the flow of exhaust gas.

2. An induction pressure responsive air diverter valve for use on an internal combustion engine having an induction system, a throttle disposed in said induction system for controlling flow therethrough, an exhaust system, and an engine driven positive displacement air pump for supplying air to said exhaust system; and air diverter valve comprising a housing, said housing having upper and lower portions, a first diaphragm secured between said upper and lower portions and partitioning said upper housing portion ito a control chamber therebelow and a first vacuum chamber thereabove, a valve stem secured to and extending upwardly from said first diaphragm axially in said upper housing portion, a valve member connected to said valve stem for movement thereby, said upper housing portion defining a valve chamber about said valve member, said valve chamber having an inlet for receiving air from said air pump and a main outlet for directing air from said valve chamber to said exhaust system, an upper valve seat formed in said main outlet for receiving said valve member, an annular insert member diposed within said upper housing portion between said first diaphragm and said valve chamber, said insert member surrounding and guiding said valve stem, said insert member and said upper housing portion defining an annular chamber therebetween, said insert member sealing said first diaphragm from said valve chamber and said chamber and further sealing said valve chamber from said annular chamber, said insert member having a cylindrical recess opening to said valve chamber, said recess being coaxial with said valve stem and having a lower valve seat formed thereabout for receiving said valve member, said insert member having at least one aperture opening from said recess to said annular chamber and said upper housing portion having at least one aperture opening from said annular chamber to the atmosphere, a first spring disposed in said first vacuum chamber about said valve stem between said first diaphragm and said insert member for biasing said valve stem and said valve member toward said lower seat, a passage formed in said diaphragm for connecting said control chamber and said vacuum chamber, a check valve disposed in said passage for controlling flow therethrough, at least one leg extending from the lower portion of said valve stem, and control means for overriding said first diaphragm and for positioning said valve stem and said valve member, said control means comprising: a downwardly concave cup portion formed in the lower housing portion below said control chamber, a guide portion formed in the top of said cup portion and opening into said control chamber, a seat portion formed around said guide portion in said control chamber; a cover member closing the bottom of said cup portion, said lower housing portion having a spun over portion for securing said cover member, said cover member having at least one aperture opening to the atmosphere; a proportioning diaphragm attached to and partitioning the concave interior of said cup portion into a second vacuum chamber formed between said proportioning diaphragm and said cup portion and an atmospheric chamber formed between said proportioning diaphragm and said cover member; said second vacuum chamber adapted for connection to the vacuum occurring in said induction system downstream of said throttle; a rod having one end connected to said second diaphragm, said rod extending through said guide portion and having its opposite end disposed in said control chamber, a platen secured to said opposite end and having a spacer for residing on said seat portion therebelow, said platen adapted to engage said leg of said stem thereabove for moving said valve member; and a second spring disposed axially about said rod beween said cup portion and said proportioning diaphragm for biasing said rod and said platen towards said seat portion; whereby said first spring may move said valve member downwardly into engagement with said lower valve seat to thereby direct air flow from said inlet through said valve chamber and said main outlet to said exhaust system; and whereby said first diaphragm may actuate said valve stem to move said valve member from engagement with said lower valve seat into engagement with said upper valve seat only when said vacuum in said induction system is suddenly increased to thereby direct air flow from said inlet through said valve chamber into said recess and through said insert aperture and said housing aperture to the atmosphere; and whereby said proportioning diaphragm moves said rod and said platen to engage said leg and move said stem thereby so that when said vacuum is reduced said valve member is biased by said first spring toward said lower seat to permit air flow to said exhaust system and when said vacuum is increased said proportioning diaphragm moves said rod, said platen, said leg and said valve stem against the urging of said first and second springs to move said valve member toward said upper seat to reduce air flow through said main outlet to said exhaust system and to increase air flow through said valve chamber, into said recess and through said insert aperture and said housing to the atmosphere so that air flow to said exhaust system may be proportioned to the flow of exhaust gas through said exhaust system.

3. An induction pressure and operating temperature resonsive air diverter valve for use on an internal combustion engine having an induction system, a throttle disposed in said induction system for controlling flow therethrough, an exhaust system, and an air pump for supplying air to said exhaust system; said air diverter valve having a housing, said housing having lower and upper portions, a first diapragm partitioning one end of said upper housing portion into a control chamber therebelow and a first vacuum chamber thereabove, a valve stem secured to and extending from said first diaphragm axially into said upper housing portion, a valve member connected to said valve stem for movement thereby, said upper housing portion defining a valve chamber about said valve member, said valve chamber having an inlet for receiving air from said air pump and a main outlet for directing air from said valve chamber to said exhaust system, an upper valve seat formed in said main outlet for receiving said valve member, an annular insert member disposed within said upper housing portion between said first diaphragm and said valve chamber, said insert member surrounding and guiding said valve stem, said insert member and said upper housing portion defining an annular chamber therebetween, said insert member sealing said first diaphragm from said valve chamber and said annular chamber and further sealing said valve chamber from said annular chamber, said insert member having a cylindrical recess opening to said valve chamber, said recess being coaxial with said valve stem and having a lower valve seat formed thereabout for receiving said valve member, said insert member having at least one aperture opening from said recess to said annular chamber and said upper housing portion having at least one aperature opening from said annular chamber to the atmoshpere, a first spring disposed in said first vacuum chamber about said valve stem between said first diaphragm and said insert member for biasing said valve stem and said valve member toward said lower seat a passage formed in said diaphragm for connecting said control chamber and said vacuum chamber, a check valve disposed in said passage for controlling flow therethrough, at least one leg extending from the lower portion of said valve stem, and means for overriding said first diaphragm and for positioning said valve stem and said valve member, said means comprising: a downwardly concave cup portion formed in the lower portion of said housing below said control member, a guide portion formed in the top of said cup portion, a seat portion associated with said guide portion and formed therearound in said chamber; a cover member closing the bottom of said cup portion said lower housing portion having a spun over portion for securing said cover member, said cover member having at least one aperture opening to the atmosphere, a proportioning diaphragm attached to and partitioning the concave interior of said cup portion into a second vacuum chamber foremed between said proportioning diaphragm and said cup portion and an atmospheric chamber formed between said proportioning diaphragm and said cover member; conduit means for exposing said second vacuum chamber to the vacuum occurring in said induction system downstream of said throttle, said conduit means having temperature responsive means associated therewith to permit fluid flow therethrough only above a preselected temperature; a rod having one end connected to said second diaphragm, said rod extending through said guide portion and having its opposite end disposed in said control chamber, a platen portion formed about said opposite end and having a spacer for residing on said seat portion therebelow, said platen adapted for registration with said leg of said stem for moving said valve member; and a second spring disposed axially about said rod between said cup portion and said proportioning diaphragm for biasing said rod and said platen towards said seat portion; whereby said first spring may move said valve member downwardly into engagement with said lower valve seat to thereby direct air flow from said inlet through said valve chamber and said main outlet to said exhaust system; and whereby upon sudden increase of said vacuum in said first vacuum chamber said first diaphragm may acutuate said valve stem to move said valve member from engagement with said lower valve seat into engagement with said upper valve seat to thereby direct air flow from said inlet through said valve chamber into said recess and through said insert aperture and said housing aperture to the atmosphere; and whereby said proportioning diaphragm may move said rod and said platen to engage said leg and move said stem thereby moving said valve member in direct proportion to said vacuum only when said preselected temperture is attained so that when said vacuum is reduced said valve member is biased by said first spring toward said lower seat to permit increased air flow to said exhaust system and when said vacuum is increased said proportioning diaphragm is moved by the pressure differential thereacross and moves said rod, said platen, said leg, and said valve stem against the urging of said first and second springs to move said valve member toward said upper seat to reduce air flow to said exhaust system and to increase air flow through said valve chamber, into said recess and through said insert aperture and said housing aperature to the atmosphere so that air flow to said exhaust system may be proportioned to the flow of exhaust gas through said exhaust system.

* * * * *